(12) United States Patent
Ma et al.

(10) Patent No.: US 11,754,797 B2
(45) Date of Patent: *Sep. 12, 2023

(54) HIGH-DENSITY OPTICAL MODULE SYSTEM

(71) Applicant: OptiWorks, Inc., Fremont, CA (US)

(72) Inventors: Yanyan Ma, San Jose, CA (US); Tao Han, Shanghai (CN); Chuanxing Zhu, Fremont, CA (US)

(73) Assignee: OptiWorks, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,593

(22) Filed: Mar. 31, 2022

(65) Prior Publication Data

US 2022/0229256 A1  Jul. 21, 2022

Related U.S. Application Data

(63) Continuation of application No. 14/659,564, filed on Mar. 16, 2015, now Pat. No. 11,333,842.

(51) Int. Cl.
*G02B 6/44* (2006.01)

(52) U.S. Cl.
CPC ......... *G02B 6/4455* (2013.01); *G02B 6/4452* (2013.01)

(58) Field of Classification Search
None
See application file for complete search history.

(56) References Cited

U.S. PATENT DOCUMENTS

| | | |
|---|---|---|
| 8,326,107 B2 | 12/2012 | Cooke |
| 2010/0322579 A1 | 12/2010 | Cooke |
| 2012/0106911 A1 | 5/2012 | Cooke |
| 2013/0287357 A1 | 10/2013 | Solheid |
| 2022/0229257 A1* | 7/2022 | Ma ................. G02B 6/4455 |

* cited by examiner

*Primary Examiner* — Chad H Smith
(74) *Attorney, Agent, or Firm* — Finnegan, Henderson, Farabow, Garrett & Dunner, L.L.P

(57) ABSTRACT

A high-density optical module system of the present invention comprises: a multi-tier housing assembly, multiple sliding tray assemblies engaged inside each of the multi-tier housing assembly and is moveable inwardly and outwardly within the multi-tier housing assembly with the handle bar; and a multiple rows of the multi-port modules arranged in horizontal arrays containing plural ports connected to the cable adaptors, wherein the multi-port modules are fastened into the sliding tray assembly. The height of the high-density optical module system is approximately 1 RU (19 inches) containing at least 216 LC or 108 SC multiple connector ports.

22 Claims, 11 Drawing Sheets

HIGH-DENSITY OPTICAL MODULE SYSTEM

CROSS-REFERENCE TO RELATED APPLICATIONS

This application is a continuation of U.S. patent application Ser. No. 14/659,564, filed on Mar. 16, 2015 and entitled "HIGH-DENSITY OPTICAL MODULE SYSTEM," which is related to U.S. Design patent application Ser. No. D/520, 627 entitled "High-Density Optical module System." The disclosures of the above-referenced applications are incorporated herein by reference in their entireties.

FIELD OF THE INVENTION

The present invention generally relates to a device and a system to fiber-optic communications. More specifically, the present invention relates to optical module device and system communications, which facilitates access to manage fiber optic connectors, adaptors, and ports, and maximize the space utilization thereof.

BACKGROUND OF THE INVENTION

In the management of fiber-optic connector communications, a plurality of fiber-optic cables are interconnected through connectors or adaptors. The front side of the optical module provides for the use of connecting and routing circuits for energy transmission adaptors, such as the adaptors or the fiber optic cable adaptors. The rear side of the optical module provides for connections to the long wires or cables. Optical modules are commonly used with high demands in computer networking, cloud data and storage, audio and video equipment and fiber optical telecommunications.

Optical module provides the feature of cabling management in a convenient and flexible manner. The good cabling management provides customers with the ability to dynamically scale and adapt to change their IT infrastructure while minimizing required service time. Traditional fiber optic optical modules generally include fiber optic shelves having only a single optical module or multiple modular panels on the front patching sides of the shelves. However, the numbers of the connector ports are usually low due to the limited spacing of the front sides of the optical modules. As the technology rises especially in the cloud data storage, telecommunication and computer networking fields, the demand for high density solutions are increasing as the needs for the improved port solutions, energy efficiency, and storage consolidation and virtualization. Therefore, it is desirable in the market to provide optical modules having increased connector ports density per unit volume of area for providing the maximum connections and efficiencies.

The solutions for high density optical modules focus on high utilized racks to minimize the footprint, increase the adaptors per rack to maximize space utilization. The design of high density optical modules is required to allow the maximum quantity of adaptors in a very limited rack space, usually in a 1 U standard size (19'). However, it is quite challenging to couple all the individual adaptors in a crowded 1 U space. The conventional optical modules have limitations on providing the maximum numbers of connector ports.

Further, users need special tools such as extractors in order to access to plug and pull out the adaptors from the connector terminals within the limited 1 U space. As more connector ports are paced within the limited 1 U space, it creates problems for technicians to access and remove the connectors by using their hands. Moreover, in the traditional high-density optical modules, the connector ports are arranged in multiple rows or columns spaced with a 1 U unit. The arrangement of ports further creates difficult tasks for the technicians to access or remove the connectors within the crowded rows or columns of ports.

There is a need for a new device and system of the optical module to facilitate access the communication connectors and adapters.

There is a need for a high-density optical module system for passive optical tap in a 1 RU chassis, which enables services providers, data centers, enterprises and technicians to save valuable rack space while monitoring more fibers.

There is a need for a high-density optical module system for the wavelength-division multiplexing (WDM) technology which enables bidirectional communications over the strand of fiber optic communications and multiplication of capacity.

SUMMARY OF THE INVENTION

An object of the present invention is to provide a high-density optical module system with the maximum numbers of pre-loading or pre-connection of the fiber optic adaptors to the connector terminals of the optical module to facilitate the connections of the adaptors.

A further object of the present invention is to provide a high-density optical module system that optimizes the use of the space of the plurality of connector ports.

Still another object of the present invention is to provide a high-density optical module system with easy access to the plugs for making and breaking connector connections without applying specific tools.

Still another object of the present invention is to provide a high-density optical module system to facilitate the positioning and coupling between the adaptors to the connector terminals of the optical module to facilitate the connections of the adaptors.

Still another object of the present invention is to provide a high-density optical module system to be used In one embodiment, the high-density optical module system of the present invention comprises: (a) a multi-tier housing assembly, (b) multiple sliding tray assemblies engaged inside each of the multi-tier housing assembly and moveable inwardly and outwardly within the multi-tier housing assembly; and (c) a plurality of multi-port modules fastened with the sliding tray assembly and operably connected to the adaptors.

In another embodiment, the high-density optical module system further comprises: (a) the multi-tier housing assembly comprises: a tray, a pair of opposing first sides extending perpendicularly from ttle tray, a second back side extending perpendicular from the tray and is perpendicular to the pair of the first sides, a dividing plate containing the horizontal plate and the vertical plates, the front top plate, and a pair of the L-shaped brackets securely fastened to the multi-tier housing assembly; and (b) the sliding tray assembly comprises: a tray, a pair of opposing first sides extending perpendicularly from the tray, a optical module frame, a plurality of vertical dividing frames substantially perpendicular to the optical module frame, a second back side extending perpendicularly from the tray and parallel to the vertical dividing frames, a top cover containing an elongated raised frame and in contact with the optical module, a plurality of the window openings positioned on the elongated raised frame for fastening into the corresponding multi-port modules, a pair of the handle walls elongated from the first sides, and a handle bar mounted to the handle walls of the sliding tray assembly with screws.

In another embodiment, the high-density optical module system of the present invention comprises: (a) a multi-tier housing assembly, comprising a tray, a pair of opposing first sides extending perpendicularly from the tray, a second back side extending perpendicular from the tray and is perpendicular to the pair of the first sides, a dividing plate containing the horizontal plate and the vertical plates, the front top plate, and a pair of the L-shaped brackets securely fastened to the multi-tier housing assembly; (b) a sliding tray assembly engaged inside the multi-tier housing assembly and moveable inwardly and outwardly within therein; the sliding tray assemblies comprising: a tray, a pair of opposing first sides extending perpendicularly from the tray, a optical module frame, a plurality of vertical dividing frames substantially perpendicular to the optical module "frame, a second back side extending perpendicularly from the tray and parallel to the vertical dividing frames, a top cover containing an elongated raised frame and in contact with the optical module, a plurality of the window openings positioned on the elongated raised frame for fastening into the corresponding multi-port modules, a pair of the handle walls elongated from the first sides, and a handle bar mounted to the handle walls of the sliding tray assembly with screws; and (c) a plurality of multi-port modules fastened with the sliding tray assembly and operably connected to the cable adaptors.

DETAILED DESCRIPTION

Disclosed herein is a high density optical module system 200 illustrated in FIGS. 1-11. The optical module system 100 is used for centralizing and supporting the connections of a plurality of adaptors at a single rack mounted panel. The optical module system 100 can also be used in wall mounting applications and outside plant closure applications.

Figure 1:
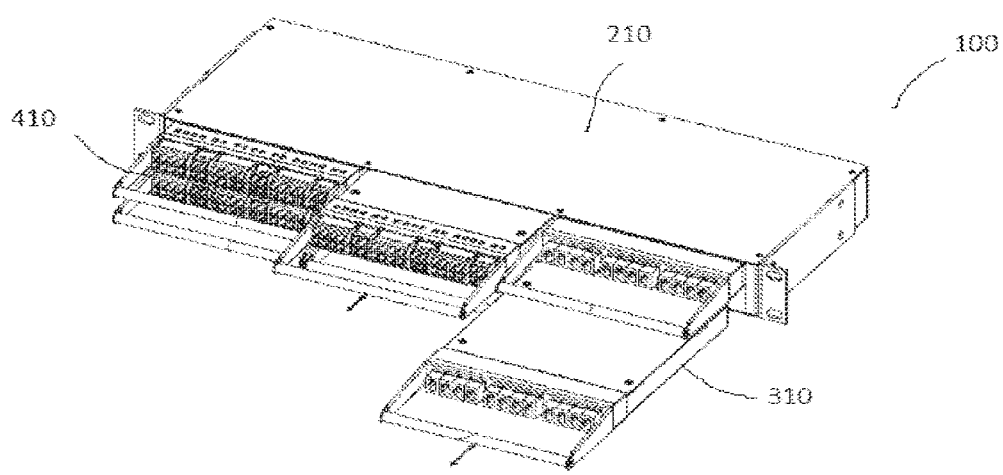
FIG. 1 is a generally front perspective view of a high-density optical module system according to the present invention containing 3 units of the assembly set.

The high-density optical module system 100 comprises a multi-tier housing assembly 210, the sliding tray assembly 310, and a plurality of multi-port modules 410. The single sliding tray assembly 310 is engaged inside the housing assembly 210 and can be fully extracted outwardly or extended inwardly from the housing assembly 210 by the user's hand operation. The plurality of multi-port modules 410 are coupled with the adaptors for connections. As shown in FIG. 1, the high-density optical module system 100 contains a 2-tier housing assembly 210, which accommodates two sliding tray assemblies 310 engaged therein. Further as shown in FIG. 1, the optical module system 100 contain three units of the multi-tier housing assembly-sliding tray assembly-multiport modules sets 210, 310, and 410 respectively (the "assembly set").

Figure 2:
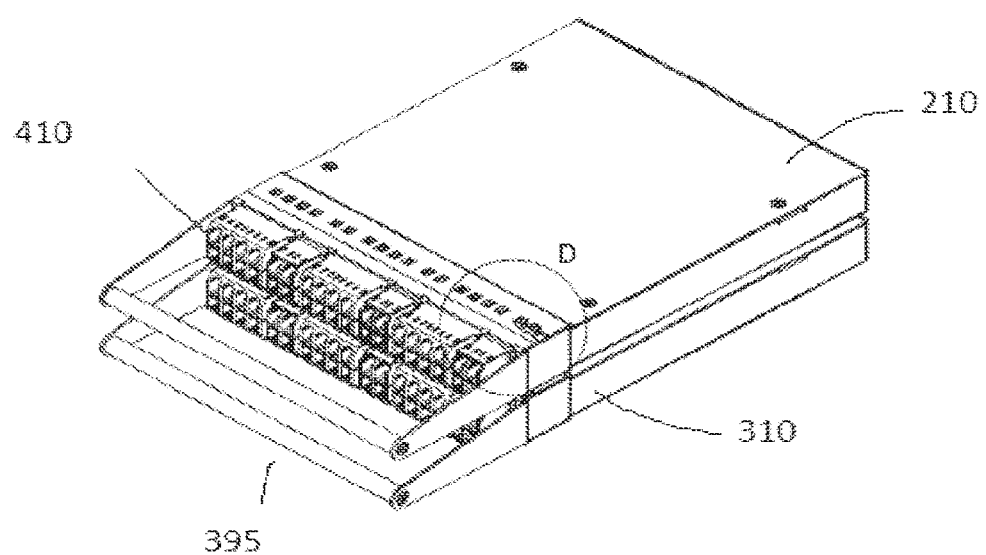
FIG. 2 is a generally front perspective view containing one single unit of the optical module system of the present invention.

The present invention of the optical module system 100 contains two half-U (about 0.875 inches in height) single assembly sets. The single assembly set contains a sliding tray assembly 310 located within one of the two-tier housing assembly 210, wherein the sliding tray assembly is securely coupled with the multi-port modules 410. FIG. 2 shows the high-density optical module system 100 of the present invention. The optical module system 100 contains a two-tier housing assembly 210, and two sliding tray assemblies 310. Each of the sliding tray assembly 310 is engaged within the corresponding housing assembly 210 and coupled with two rows of the multi-port modules 410. As shown in FIG. 2, the height of the optical module system is in approximately 1 RU (1.75 inches in height for a standard 19 inch wide rack). In the present invention, the optical module system 100 contains 2 separate half-U assembly set. Each of the half-U assembly set has a height in approximately half-RU (which is 0.875 inches). When the user pulls out or insert the adaptors onto the corresponding ports from the multi-port modules, he or she can pull out or push back the handle bar 395 from the half-U single assembly set. The present invention of the half-U assembly set provides ease and conveniences to the users in cable management and operation.

Figure 3:
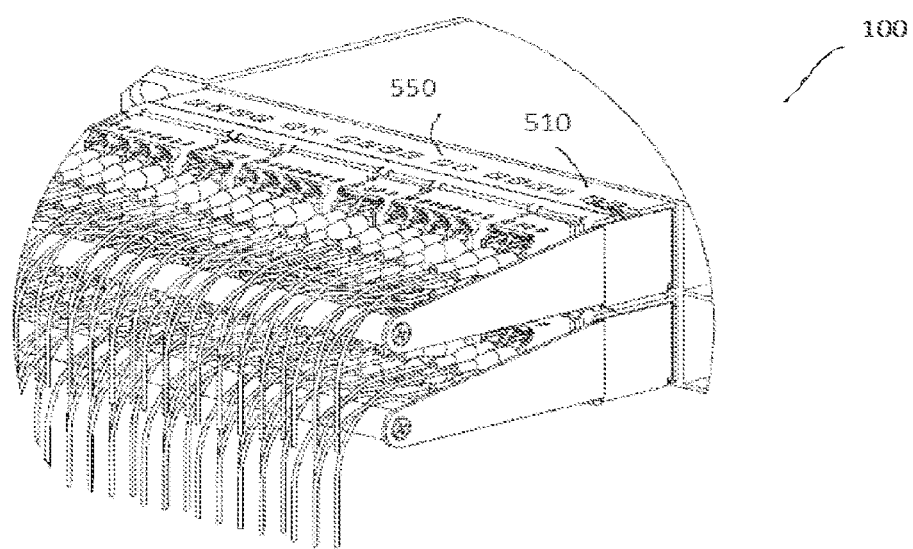
FIG. 3 is a partial, enlarged view of a high-density optical module system of FIG. 2 illustrating 1 unit of the rack, i.e. "one rack unit" or 1 U also known as 1 RU (a standard 1.75 inches in height) and a plurality of multi-port modules engaged with the plurality of the adaptors mounted therein.

FIG. 3 is a partial, enlarged view of an optical module system 100 of FIG. 2 illustrating one unit of the assembly set, showing a plurality of multi-port modules 410 engaged with the plurality of the adaptors mounted therein. Each unit of the assembly set fits the standard 1 RU (1.75 inches in height in a 19 inch wide rack) size, containing 216 LC or 108 SC multiple connector ports. In the embodiment shown in FIG. 1, the high-density optical module 100 contains three units of the assembly set. In another embodiment, the high-density optical module 100 contains a single unit of the assembly set. Still in another embodiment, the optical module 100 contains multiple units of the assembly sets.

As shown in FIGS. 1 & 2, the high-density optical module system 100 contains the first row of a plurality of multi-port modules 410 and the second row of a plurality of multi-port modules 410. Each of the multi-port modules 410 contains two ports for receiving two adaptors. However, it should be noted that these 2 multi-port modules 410 could be horizontal multi-port modules. Still in another embodiment, the high-density optical module system 100 contains multiple rows of the multi-port modules 410 within a 1 U standard size. Still in another embodiment, the optical module system 100 can be vertically mounted to the wall. In this embodiment, each of the multi-port modules 410 are positioned side-by-side for the connection purposes.

Figure 4:
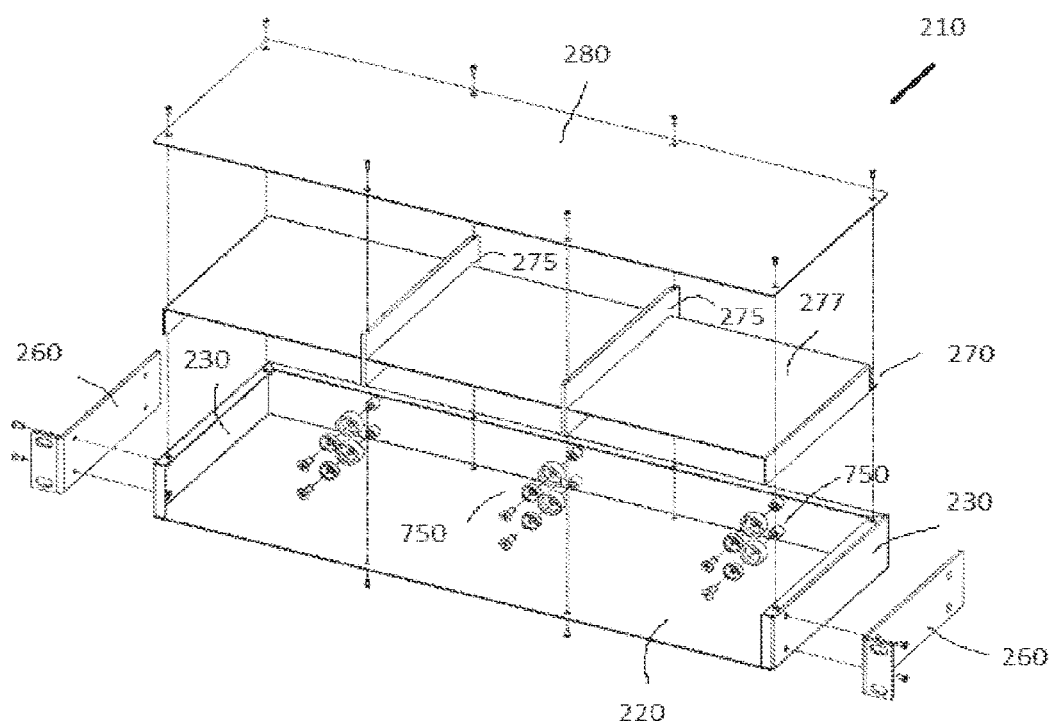
FIG. 4 is a generally front perspective view of the multi-tier housing assembly of high-density optical module system of FIG. 1.

FIG. 4 shows the multi-tier housing assembly 210 of the optical module system 100. The multi-tier housing assembly 210 contains a tray 220, a pair of opposing first sides 230 extending perpendicularly from the tray 220, a second back side 240 extending perpendicular from the tray 220 and is perpendicular to the pair of the first sides 230, a dividing plate 270 containing the horizontal plate 277 and the vertical plates 275, the front top plate 280, and a pair of the L-shaped brackets 260 that are securely fastened into the parts of the multi-tier housing assembly 210 all together as shown in FIGS. 1-4.

In the embodiment shown in FIG. 4, the high-density optical module system 100 is a two-tier optical module, i.e., the housing assembly 210 is a 2-tier housing that is able to accommodate two rows of the corresponding sliding tray assemblies 310. In one embodiment, the total height of the housing assembly 210 of the optical module system 100 is 1 U standard size (in a 19' wide rack). In this two-tier housing 210, the height of each assembly set (ie, each of the two-tier housing assembly-sliding tray assembly-multiport modules set) is about only one-half U size, which is less than 0.875 inch in height. However, it should be noted that the optical module system 100 could be a one-tier optical module frame (i.e., only one row of the assembly set) to accommodate less modules in a 0.875 inch height. Alternatively, for connecting the nano-sized connectors, the high-density optical module system 100 of the present invention could have more than two rows of the assembly sets to accommodate and connect more adaptors in order to fit industry needs. Moreover, it should be noted that although the frame may have room for two or more rows of the assembly set, that only one row may be populated. One or more rows may be left empty and accommodate further expansion when additional multi-ports are required.

Figure 5:
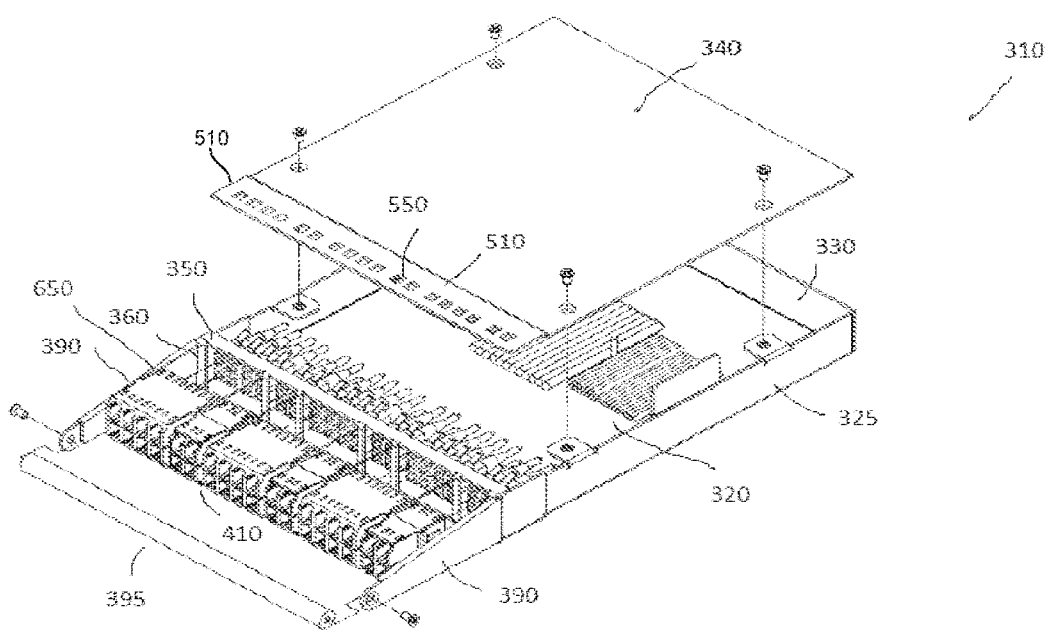
FIG. 5 is a generally front perspective view of the sliding tray assembly of the high-density optical module system.

FIG. 5 shows the sliding tray assembly 310 of the present optical module system 100. The sliding tray assembly contains a tray 320 for the storage and management of the cables, a pair of opposing first sides 325 extending perpendicularly from the tray 320, a optical module frame 350, a plurality of vertical dividing frames 360 that is substantially perpendicular to the optical module frame 350, a second back side 230 extending perpendicularly from the tray 320 and is parallel to the vertical dividing frames 360, and a top cover 340 mounted on the tray assembly 310 with screws. The optical module frame 350 and the vertical dividing frames 360 form several blocks to facilitate the insertion and connection of the multi-ports modules 410.

Figure 6:
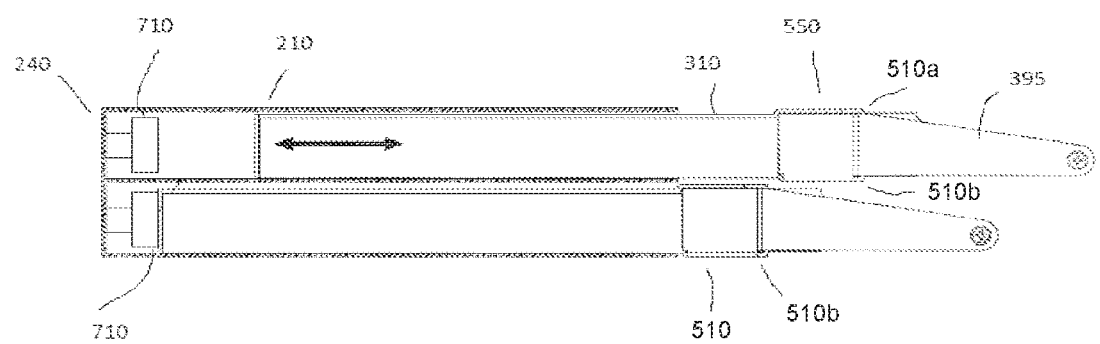
FIG. 6 is the side view of the high-density optical module system containing a two-tier housing assembly containing two sliding tray assemblies.
Figure 8:
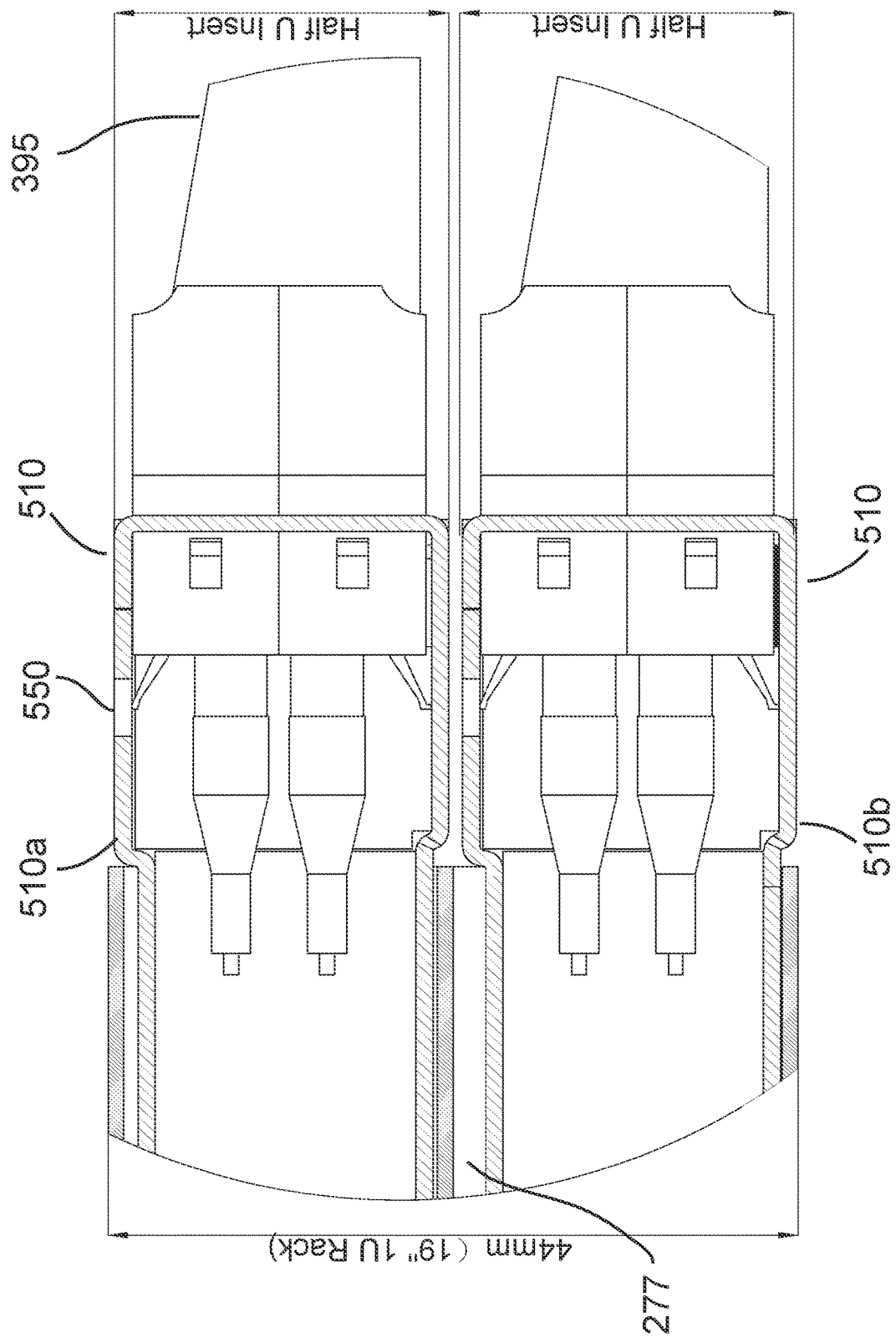
FIG. 8 is a partial, enlarged view of the high-density optical module system of FIG. 7.
Figure 10:
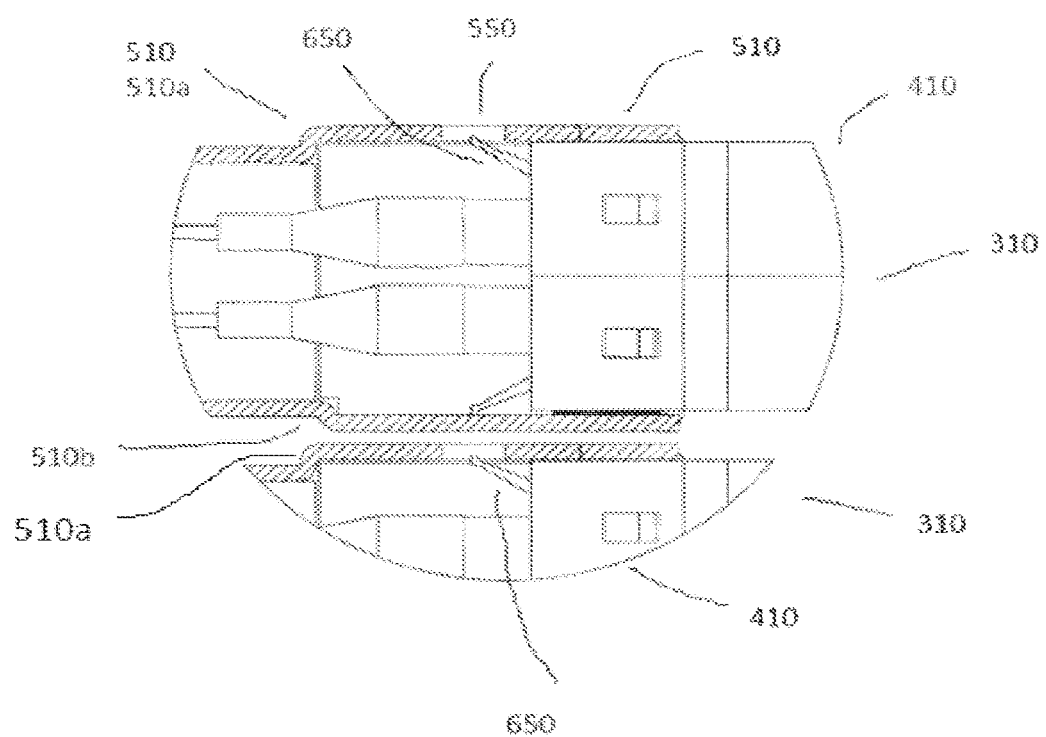
FIG. 10 is a partial, enlarged view of the high-density optical module system of FIG. 7.

FIG. 6 is the side view of the optical module system 100 with a 2-tier design. As shown in FIG. 6, there is a two-tier housing assembly 210 and two sliding tray assemblies 310. The upper row of FIG. 6 shows the sliding tray assembly 310 extended outwardly from the multi-tier housing assembly 210 by pulling the handle bar 395. In FIGS. 5 & 6, the sliding tray assembly 310 contains an elongated raised frame 510 extended from the top cover 340. As shown in FIG. 8, the elongated raise frame 510 contains an upper part 510a and a lower part 510b. The upper part 510a is substantially in the same height as the front top plate 280 in the horizontal plane. The lower part 510b is substantially in the same height in horizontal positions as the tray 220. In other words, as shown in FIG. 10, the height of each of the sliding tray assembly 310 is about half-U (0.875 inches). The design of the elongated raise frame 510 can facilitate the insertion and extraction of the plurality of the adaptors from the multi-port modules. FIGS. 6 & 10 show the two sliding tray assemblies 310 stacked in the upper 1st and lower 2nd rows positions. As shown in FIG. 10, there is a space between the raised lower part 510b of the 1st row and the upper part 510a of the 2nd row. The space between two sliding tray assemblies 310 leaves certain space to accommodate the thickness of the horizontal dividing plate 270 of the multi-tier housing assembly 210. Therefore the total height of the multi-tier housing assembly 210—sliding tray assembly 310 set is about 1 U standard size. The purposes of the design of the elongated raised frame 510 are to apply the maximum space usage of the high-density optical module 100 to accommodate the maximum numbers of multi-port modules 410 in a limited half-U (0.875 inches) industry height.

Figure 9:
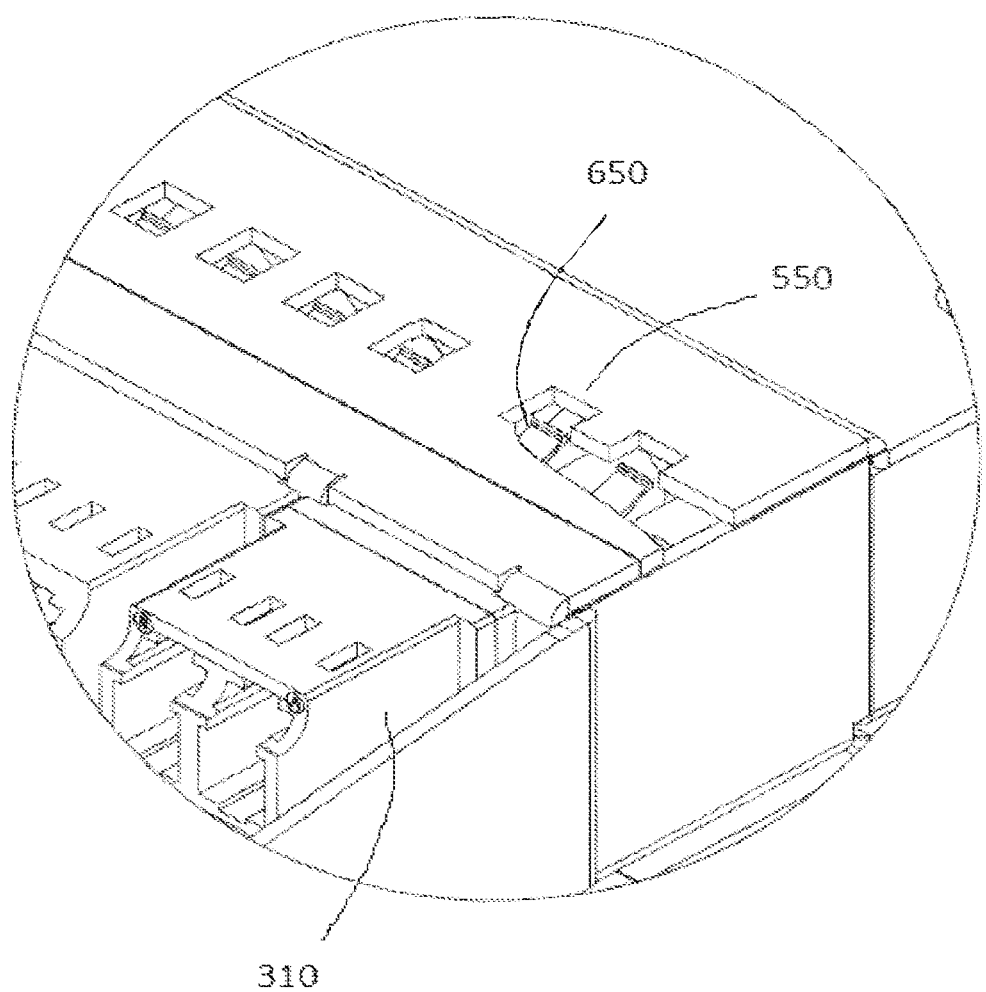
FIG. 9 is a partial, enlarged view of the high-density optical module system of FIG. 2.

The high-density optical module system 100 provides a fastened engagement between the multi-port modules 410 and the housing-sliding tray assemblies 210, 310. The snap or fastened design facilitates the optical connections for the adaptors. As shown in FIG. 5, the elongated raised frame 510 of the sliding tray assembly 310 contains a plurality of window openings 550 positioned thereof. Each of the multi-port modules contains multiple elastic snaps 650 on the upper side thereof. FIGS. 9 & 10 are the enlarged, partial portion of FIG. 6 showing the snap mechanism between sliding tray assembly 310 and the multi-port module assembly 410. When the multi-port module 410 is inserted onto the corresponding port of the high-density optical module system 100 from the other side (i.e., inside) of sliding tray assembly 310, the upper elastic snap 650 of the module 410 will slide, snap and couple with the corresponding window opening 550 and is securely fastened within the optical module system 100. The fastened engagement provides a click snap mechanism so the operators can aware if the multi-port modules are securely fastened onto the optical module system 100. FIG. 10 shows an enlarged, partial cross-sectional portion of FIG. 6 with two sliding tray assemblies 310 stacked in the upper and lower rows. The upper portion of the multi-port module assembly 410 contains an elastic snap 650. When the multiport module assembly 410 is fully inserted into the sliding tray assembly 310, the elastic snap 650 will click and pop out from the window opening 550 of the elongated raise frame 510 of the sliding tray assembly 310. If the multi-port module assembly is not fully engaged with the sliding tray assembly 310, the user can see from the eyeball because the elastic snap 650 is not popping out from the window opening of the sliding tray assembly 310. This fastening mechanism provides the secured connections between the adaptors and corresponding ports.

Figure 11:
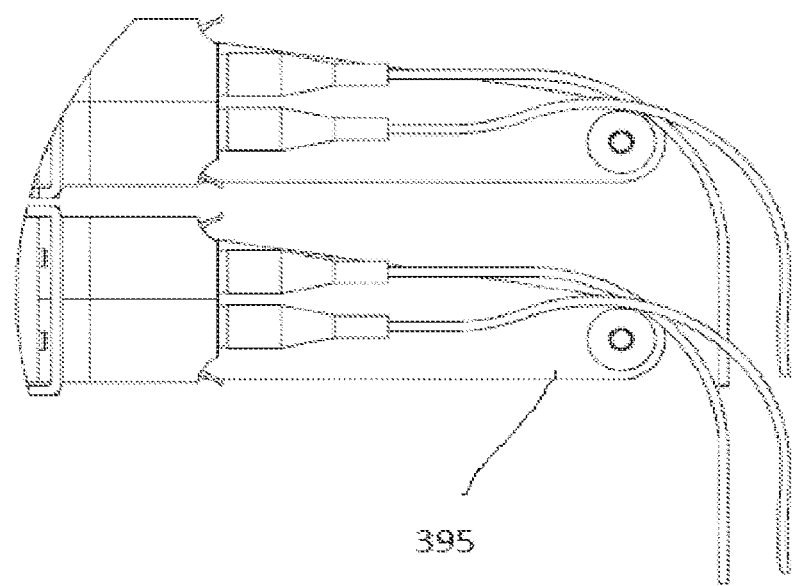
FIG. 11 is a partial, enlarged view of the high-density optical module system of FIG. 3.

As shown in FIG. 5, the high-density optical module system 100 contains a pair of the handle walls 390 elongated from the first sides 325 of the sliding tray assembly 310. The handle bar 395 is mounted on the handle walls 390 with screws. In one embodiment, the design of the handle bar 395 can facilitate the users to pull out or insert the adaptors or cables with ease. The general users do not need to carry extra tools such as extractors during cable operations. Moreover, the handle bar coupled with the housing-sliding tray-multi-port modules assembly in the limited half-U height space design provide great ease and conveniences for the high-tech companies in the cable management. In another embodiment of the present invention, the handle bar 395 can be used as a wiring hub to manage and tie all the cable wiring together. As shown in FIG. 3, the adaptors lines or wires are allocated above the handle bar 395, so the wires are not messy around the optical module system 100. Still in another embodiment as shown in FIG. 11, the handle bar 395 contains a snap mechanism to tie and collect these adaptors wires or lines in one location.

The present invention further provides a magnet mechanism to assure the close engagement between the sliding assembly 310 with the multi-tier housing assembly 210 for connection purposes. In the high-density optical module, the adaptors-assembly set are heavy loaded to a crowded 1 U space side. When the user finishes the operation of the cable management and push back the adaptor sets into the optical module system, due to heavy weight, it usually makes the user difficult to ascertain if the sliding tray assembly is completed engaged into the multi-tier housing assembly of the optical module system. The present invention is presented to solve this issue. In one embodiment, as shown in FIG. 6, the second back side 240 of the multi-tier housing assembly 210 contains a magnet system 710 mounted therein. Each of the sliding tray assembly 310 is moveable between the multi-tier housing assembly 210. The magnet system 710 on the multi-tier housing assembly 210 creates a magnetic force in certain degrees to pull the sliding tray assembly 310 toward it. When the user push the handle bar 395 back, the sliding tray assembly 310 will be easily engaged with the multi-tier housing assembly 210 by the magnet system 710.

Figure 7:
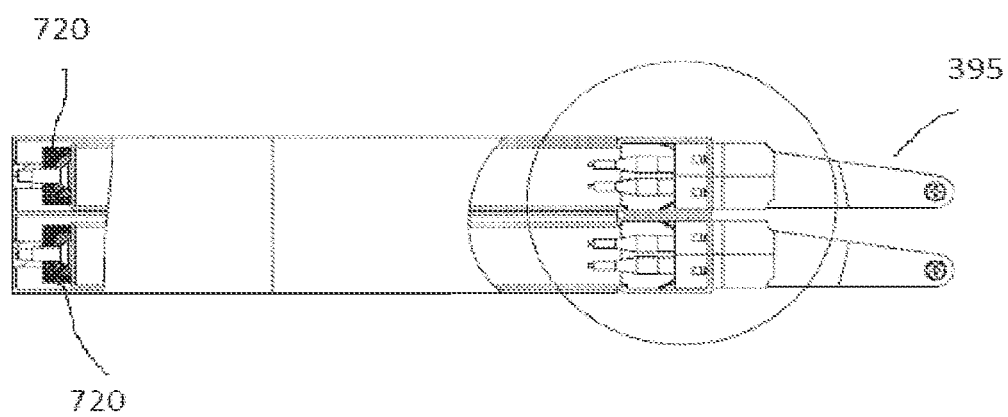
FIG. 7 is partial, enlarged view of the high-density optical module system of FIG. 6 containing the magnet system.

In another embodiment, FIG. 7 shows the second embodiment of the magnet system of the optical module system 100. As shown in FIGS. 7 & 8, the optical module system 100 contains a magnet system 720 attached to the second back side 230 of the sliding tray assembly 310. When the user finishes the cable operation and pushes the handle bar 395 of the sliding tray 310 back into the multi-tier housing assembly 210, the sliding tray assembly 310 is firmly engaged with the multi-tier housing assembly 210 through the magnetic force, thereby provide the maximum optical connections for the high-density panel system 100. Further, the design of the magnet 710 can facilitate the users to pull back the heavy-loaded adaptor optical module system with ease and conveniences.

Still in another embodiment, the high-density optical module system 100 can be applied for the passive optical tap in a 1 RU chassis, which enables services providers, data centers, enterprises and technicians to save valuable rack space while monitoring more fibers.

Still in another embodiment, the high-density optical module system 100 can be applied for the wavelength-division multiplexing (WDM) technology which enables bidirectional communications over the strand of fiber optic communications and multiplication of capacity.

Although the present invention has been described with reference to preferred embodiments, it is to be understood that these embodiments are merely illustrative of the principles and applications of the present invention. It is to be understood unless otherwise indicated herein that the figures are not intended to be to scale. It is therefore to be understood that numerous modifications may be made to the illustrative embodiments and that other arrangements may be devised without departing from the spirit and scope of the present invention as defined by the appended claims.

What is claimed is:

1. An optical module sliding tray configured to receive a first plurality of optical fiber connectors, the optical module sliding tray comprising:
    a housing configured to be mountable in a rack, the housing comprising:
        two side walls being on two opposing lateral sides of the housing; and
        a bottom surface coupled with the two side walls; and
        a top cover coupled with the two side walls of the housing, the top cover comprising:
            a top surface portion covering at least a portion of the housing, the top surface being coupled with the two side walls near the two opposing lateral sides of the housing;
            a raised edge portion near a front end of the housing, the raised edge portion of the top surface comprising a first plurality of window openings enabling an insertion of the first plurality of optical fiber connectors having protrusions, wherein the protrusions are configured to be respectively fitted into the first plurality of window openings when the first plurality of optical fiber connectors are inserted to secure the first plurality of optical fiber connectors in a locking position relative to the top cover.

2. The optical module sliding tray of claim 1, wherein the bottom surface comprises:
    a raised edge portion of the bottom surface near the front end of the housing, wherein the raised edge portion of the top cover and the raised portion of the bottom surface are configured to provide a space for fitting one or more horizontal rows of the optical fiber connectors between the raised edge portion of the top cover and the raised portion of the bottom surface.

3. The optical module sliding tray of claim 2, wherein the one or more horizontal rows of the optical fiber connectors comprise one or two rows of connectors.

4. The optical module sliding tray of claim 3, wherein the one or more horizontal rows of the optical fiber connectors comprise LC connectors or SC connectors.

5. The optical module sliding tray of claim 2, wherein a height of the housing is approximately half rack unit of a standard rack.

6. The optical module sliding tray of claim 2, wherein the raised edge portion of the bottom surface provides an opening to enable an insertion of a second plurality of optical fiber connectors having protrusions extending downwardly, wherein the protrusions are respectively fitted into the opening when the second plurality of optical fiber connectors are inserted into the optical module sliding tray, securing the second plurality of optical fiber connectors.

7. The optical module sliding tray of claim 6, wherein the opening is created by the height difference between the raised edge portion of the top surface and the raised edge portion of the bottom surface.

8. The optical module sliding tray of claim 1, wherein the housing further comprises a rear wall near a rear end of the housing, the rear wall extending generally perpendicularly from the bottom surface and configured to be magnetically coupled into a chassis.

9. The optical module sliding tray of claim 8, wherein the chassis is configured to be installed in an industrial standard one server rack unit and is configured to receive two or more optical module sliding trays arranged horizontally.

10. The optical module sliding tray of claim 8, wherein the chassis is configured to be installed in an industrial standard one server rack unit and is configured to receive two optical module sliding trays arranged vertically across the chassis.

11. The optical module sliding tray of claim 8, wherein the housing further comprises a magnet system, the magnet system comprising a magnet or a magnetic material attached to the rear wall, creating a magnetic force to secure the optical module sliding tray.

12. The optical module sliding tray of claim 1, wherein the housing further comprises a pair of handle walls, respectively elongated from the two side walls, for mounting a handlebar.

13. The optical module sliding tray of claim 12, wherein the handlebar is mounted to the handle walls.

14. The optical module sliding tray of claim 1, further comprising:
- an optical module frame; and
- a plurality of dividing frames substantially perpendicular to the optical module frame, the optical module frame and the dividing frames forming a plurality of blocks, each block being configured to receive a number of optical fiber connectors of the first plurality of optical fiber connectors.

15. The optical module sliding tray of claim 1, wherein the top surface is coupled with the two side walls of the housing with screws.

16. A sliding tray assembly configured to receive a first plurality of optical fiber connectors, the sliding tray assembly comprising:
- a sliding tray configured to enclose a plurality of fiber optic cables;
- two side walls to two opposing lateral sides of the sliding tray;
- a rear wall coupled with the two side walls near a rear end of the sliding tray; and
- a top surface coupled with the two side walls near the two opposing lateral sides of the sliding tray, the top surface providing a first plurality of window openings to enable an insertion of the first plurality of optical fiber connectors for being coupled with the plurality of fiber optic cables, wherein protrusions of the first plurality of optical fiber connectors are respectively fitted into the first plurality of window openings when the first plurality of optical fiber connectors are inserted into the sliding tray to secure the first plurality of optical fiber connectors.

17. The sliding tray assembly of claim 16, further comprising:
- an optical module frame coupled between the two side walls; and
- a plurality of vertical dividing frames substantially perpendicular to the optical module frame and coupled between the optical module frame and the sliding tray, wherein a plurality of blocks are formed by the optical module frame and the plurality of vertical dividing frames to facilitate the insertion of the first plurality of optical fiber connectors.

18. The sliding tray assembly of claim 16, further comprising a pair of handle walls respectively elongated from the two side walls for mounting a handlebar.

19. The sliding tray assembly of claim 16, wherein the top cover comprising a raised edge portion near a front end of the sliding tray assembly, and the first plurality of window openings are located on the raised edge portion.

20. The sliding tray assembly of claim 16, wherein the sliding tray assembly is configured to provide a space for fitting one or two horizontal rows of the optical fiber connectors.

21. The sliding tray assembly of claim 20, wherein the sliding tray assembly is configured to provide the space for fitting LC connectors or SC connectors.

22. The sliding tray assembly of claim 16, wherein a height of the sliding tray is approximately half rack unit of a standard rack.

* * * * *